United States Patent Office 3,150,117
Patented Sept. 22, 1964

3,150,117
AMORPHOUS POLYAMIDES BASED ON AROMATIC DICARBOXYLIC ACIDS WITH ALKYL SUBSTITUTED HEXAMETHYLENEDIAMINE
Rudolf Gabler, Zollikerberg, Zurich, Switzerland, assignor to W. R. Grace & Co., Cambridge, Mass., a corporation of Connecticut
No Drawing. Filed June 30, 1961, Ser. No. 120,943
Claims priority, application Switzerland, Oct. 29, 1959, 80,023; Great Britain, May 8, 1961, 16,725/61
20 Claims. (Cl. 260—78)

This invention relates to synthetic linear polyamides and particularly to terephthalamide and isophthalamide polymers which are transparent, thermoplastic and characterized by a high degree of swelling in certain organic liquids. The new polyamides of my invention do not form useful textile fibers but are easily moldable by injection or vacuum molding techniques or by extrusion, to form a large variety of useful shaped articles. In addition, because of their ability to swell and become liquefied in polar organic solvents, the new polyamides of my invention may be used in coatings or adhesives, or may be cast into clear, tough, transparent films.

Linear fiber-forming polyamides suitable for use in the manufacture of tire cords have been made by condensing terephthalic acid with polymethylenediamines having from six to eight carbon atoms in the hydrocarbon chain and substituted by one, or at the most two, methyl groups. These polyamides, which are described in U.S. Patent No. 2,752,328, are typical nylon polymers, being opaque, highly crystalline, easily drawn to form useful textile fibers, and melting over a narrow temperature range.

I have discovered that polyamides of radically different properties from the fiber-forming nylons described above may be made by condensing terephthalic acid, isophthalic acid or mixtures thereof with a hexamethylenediamine containing at least three side chain carbon atoms introduced by alkyl substitution of the main hydrocarbon chain. The alkyl substitution may be in the form of one or more alkyl groups, and the total number of side chain carbon atoms may vary from three to as many as eighteen. Suitable substituted hexamethylenediamines are, for example, 2-methyl-4-ethylhexamethylenediamine; 2-ethyl-4-methylhexamethylenediamine; 2,2,4-trimethylhexamethylenediamine; 2,4,4-trimethylhexamethylenediamine; 2,2,5,5-tetramethylhexamethylenediamine; 3-isopropylhexamethylenediamine; 3-isooctylhexamethylenediamine; 3-isododecylhexamethylenediamine and 2,4-diethylhexamethylenediamine.

The new polyamides of my invention contain recurring units having the following structure:

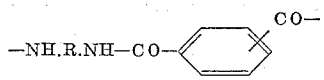

where R is a straight chain of 6 methylene groups, said chain being substituted by at least one alkyl group, the total number of side chain carbon atoms introduced by the alkyl substitution being at least 3.

Although the polyamides of my invention are closely similar in chemical structure to those of the prior art, they nevertheless possess a number of strikingly different characteristics which set them apart from the prior art polymers. The most striking property of the new polyamides of my invention is their transparent, glass clear appearance, which persists even after prolonged periods of heating and slow cooling. It is evident that these new polymers are completely amorphous, and that their amorphous state is thermodynamically stable. The new polymers, furthermore, soften gradually over a wide temperature range, usually about 20 to 40 degrees centigrade, and for this reason are particularly well suited to molding and other shaping procedures. They are not only soluble in typical polyamide solvents such as sulfuric acid, formic acid, phenol and cresol, but also swell extensively in the lower alcohols, for example, methanol, ethanol and isopropanol, to give honey-like pourable masses suitable for coating and adhesive applications. The polyamides of my invention have excellent tensile strength, impact resistance, and flexibility. Unlike conventional polyamides, however, they have a very low capacity for elongation. This property, together with their completely amorphous nature, makes the polyamides of my invention unsuitable for the production of artificial textile fibers.

The alkyl-substituted hexamethylenediamines which are used in my invention may be prepared in various ways. In one method, alkyl substituted phenols are oxidized by air or nitric acid to dicarboxylic acids, which are reacted with ammonia to form the corresponding dinitriles. The dinitriles are then converted by catalytic hydrogenation to the alkyl-substituted hexamethylenediamines. Thus, starting with 4-isopropylphenol, the end product of the synthesis is 3-isopropylhexamethylenediamine. A problem is encountered when the phenol is unsymmetrically substituted by alkyl groups, however, since a mixture of isomeric dicarboxylic acids results from the oxidation step, and the end product of the synthesis is an isomeric mixture of diamines. For example, 3-methyl-5-ethylphenol yields a mixture of 2-methyl-4-ethylhexamethylenediamine and 2-ethyl-4-methylhexamethylenediamine. The separation of such a mixture into its pure components adds a complicated and very expensive step to the process.

A similar problem is encountered when isophorone, 3,3,5-trimethylcyclohexenone, is used as the raw material for the production of trimethylhexamethylenediamine. In this process, the isophorone is hydrogenated to dihydroisophorone, which is then oxidized to form trimethyladipic acid. The synthesis then proceeds as described above, through the nitrile, to trimethylhexamethylenediamine. In this case, also, the end result is a mixture of steric isomers, 2,2,4- and 2,4,4-trimethylhexamethylenediamine.

I have discovered, quite unexpectedly, that the polyamides produced from isomeric mixtures of alkyl substituted hexamethylenediamines such as those described above possess characteristics which are practically identical with those produced from the sterically pure hexamethylenediamines. This discovery constitutes an outstanding economic advantage in the manufacture of the polyamides of my invention, since it means that the expensive and difficult step of isomer separation may be omitted from the synthesis of the unsymmetrically substituted diamines.

Terephthalic acid, isophthalic acid or mixtures of the two acids may be used to produce the polyamides of my invention. The discovery that mixtures of these acids may be employed to produce useful polyamides is most unexpected, since ordinarily the use of mixtures of acids in the preparation of superpolyamides results in products which have much lower melting points and generally less desirable properties than the corresponding polyamides made from either acid alone.

The polyamides of my invention are clear and transparent and have generally similar properties whether they are made with terephthalic acid, isophthalic acid, or with mixtures of the two. The terephthalamides are generally preferred for most purposes, however, since their melting points are from 50 to 100 degrees centigrade higher than and their mechanical properties somewhat superior to those of the corresponding isophthalamides. The melting points and mechanical properties of the mixed polymers are intermediate between those of the two types of homopolymers.

Of particular interest are the polyamides of acid mixtures containing only small amounts of isophthalic acid, preferably not more than about 5 or at the most 10 percent. These mixed polyamides melt at temperatures only slightly lower than do the corresponding terephthalamide polymers, and are indistinguishable from the pure terephthalamides with respect to their mechanical properties. For this reason, the polyamides made from low isophthalic acid content mixtures constitute a preferred form of my invention.

It is particularly important from an economic point of view that this preferred group of mixed polymers may be made from the less purified and therefore less expensive grades of terephthalic acid in which a small proportion of isophthalic acid is present as an impurity. Terephthalic acid is often produced from p-xylene, or alternatively it may be made by the isomerization of o-phthalic acid. In both these processes, it is difficult to avoid the presence of a small amount of isophthalic acid. Since a considerable portion of the cost of high purity terephthalic acid is due to the tedious and costly procedures which are necessary in order to remove the m-isomers either from the raw material or from the final product, a terephthalic acid which contains a few percent if isophthalic acid will, of course, be much less expensive than the 100 percent p-isomer. The ability to use the less expensive grades of terephthalic acid in the manufacture of polyamides is an important aspect of my invention.

Preparation of the linear polyamides of the present invention can be accomplished directly from the aromatic dicarboxylic acid and the alkylated diamines. It is more advantageous, however, first to prepare the salt of the components in a molar ratio of 1:1. This can be accomplished by means of the following general procedure:

A suspension of 1 mole of acid in 300 ml. water is heated under reflux and a solution of 1.05 moles of the alkylated diamine in 500 ml. alcohol is slowly added dropwise. Any salt which is still undissolved is brought into solution by the addition of a small quantity of water. The yellowish solution is decolorized with animal charcoal and filtered, yielding the salt in the form of colorless crystals. This is then purified by several recrystallizations from 70 to 80 percent alcohol.

Polycondensation of the salt can be effected by one of the known batch or continuous methods as developed for the preparation of polyhexamethylene adipamide (nylon 6/6). The discontinuous method is best carried out in three steps, for which the following method can generally be used:

100 parts by weight of the salt, containing 0.161 percent of an organic mono- or dicarboxylic acid as a stabilizer, is liquefied with the aid of 20 to 50 parts water at 120 to 140° C. in a stainless steel dissolving vessel which is equipped with a heating element and stirring means and connected to a medium pressure autoclave. The liquid is then transferred by nitrogen pressure into the autoclave which has been preheated to 250° C. After the release of the water vapor, the temperature is raised while still at atmosphereic pressure and under a continuous stream of nitrogen, over a period of 2 to 3 hours, to 280° C., the liquid being held at this temperature for a further 1.5 to 2 hours. Under certain circumstances, it is also advantageous to carry out an evacuation to 2.5 mm. Hg for about half an hour, in order to remove the last traces of water produced in the condensation.

Other amide-forming derivatives of the aromatic dicarboxylic acid, for example its esters with volatile alcohols, may be used in the preparation of the salt, as may the amide-forming derivatives of the diamines, for example the N,N-diformyl derivatives.

Compatible dyestuffs, plasticizers, stabilizers, bleaching agents and other additives may be added to the polycondensation reaction mixture if desired, either before, during or after the reaction. In some cases, it may be preferable to prepare a solid precondensation product first, to mix it with one or more of the above-mentioned ingredients, and finally to finish the polycondensation reaction without pressure.

The polycondensation reaction may be carried out, if desired, in an inert solvent such as N-alkyl-pyrrolidone, N-alkyl piperidone and similar cyclic amides, or in suspension in a suitable non-solvent liquid. In such cases, the polycondensation is preferably carried out at the boiling temperature of the solvent (210° to 280° C.) To remove the water, the solvent is recycled continuously and is dehydrated over a suitable drying agent. The polycondensation may also be carried out in a melt condensation process, in which case the addition of a small amount of solvent, generally no more than 10 percent, may be useful to lower the melt viscosity and to accelerate the separation of bubbles.

The polyamides of the present invention can also be prepared at lower temperatures using the boundary surface or interfacial condensation method (United States Patent No. 2,831,834), which consists in mixing, with thorough stirring, equivalent or nearly equivalent quantities of an acid halide, dissolved in a water immiscible solvent such as carbon tetrachloride, and an aqueous solution of the diamine. By this method, the polyamides are obtained as a finely granular colorless powder (intrinsic viscosity, 0.6 to 1.0).

I have found, in general, however, that it is difficult to obtain the particular polyamides of my invention in the desired high molecular weights when using the boundary surface condensation method, and for this reason, I prefer to use the thermal polycondensation process described above.

As in all polycondensation reactions, a high degree of purity of the reactants is required in the present combination of aromatic dicarboxylic acid with alkylated diamines. It has been found that both the acids and the diamines used should have a purity of at least 99.8 percent by titration in order to obtain sufficient chain length for optimum mechanical strength of the polycondensation products. Monofunctional by-products such as mono-amines, mono-imines and monocarboxylic acids are particularly deleterious.

My invention will be more clearly understood by reference to the following examples, in which all parts shown are by weight.

EXAMPLE I 16.6 parts of terephthalic acid were mixed with 30 ml. water and brought almost to boiling on a steam bath. By means of a dropper funnel, a solution of 16.5 parts of 3-isopropylhexamethylenediamine in 50 ml. alcohol was slowly added dropwise; this finally resulted in the complete solution of the terephthalic acid. After cooling, the terephthalic acid salt of 3-isopropylhexamethylenediamine precipitated out as colorless crystals melting at 241° C.; the yield was 70 to 80 percent. A further 10 to 20 percent of the salt could be obtained from the mother liquor.

A mixture of 300 g. of the above salt, 100 ml. water and 0.5 g. of glacial acetic acid was heated to 140° C. with constant agitation and exclusion of air in a 1 liter dissolving vessel of a stainless steel autoclave also having a capacity of 1 liter, resulting in the total solution of the salt. With the aid of pure nitrogen, the solution was passed through a filter into the autoclave which had been preheated to 250° C. This resulted in a drop in temperature within the autoclave to 160 to 180° C. When the heat was turned on, the pressure and temperature rose rapidly. Water vapor was released by opening the valve in the cover so that pressure equalization with atmospheric pressure was obtained at approximately the same time that an inside temperature of 250° C. was reached.

The melt was now heated without pressure to a temperature of 280° C. over a period of 3½ hours. The temperature was held at this point for 2 hours more and then the melt was extruded into cold water by means of nitrogen pressure, so as to form cylindrical rods. The polymer was transparent, melted over the range of 210 to 220° C. and had an intrinsic viscosity of 1.2.

EXAMPLE II

The salt of terephthalic acid and 2,2,4-trimethylhexamethylenediamine melting at 250° C. was prepared according to the method of Example I.

30 g. of this salt was melted in a thick-walled glass tube under nitrogen and heated to 280° C. for 5 hours. After cooling the tube was opened, some of the condensation water was poured off, and the tube heated to 250 to 280° C. under a stream of nitrogen for a further period of 3½ hours. Finally, the tube was held at the same temperature for 1 hour at a pressure of 8.1 mm. Hg and then cooled.

The resulting, light-colored, transparent polyamide, melting at 200 to 220° C. had an intrinsic viscosity of 0.8 and could be formed into tough, elastic films either from the melt or from solution.

The 2,4,4-trimethylhexamethylenediamine isomer was also used to prepare a polyterephthalamide, which was found to have identical properties with the polyamide of Example II.

EXAMPLE III

The process of Example I was followed, using 16.6 parts of terephthalic acid and 16.5 parts of an isomeric mixture of 2,2,4- and 2,4,4-trimethylhexamethylenediamine in the preparation of the salt.

The polyamide which was produced by the polycondensation reaction was transparent and glass clear, melted over the range of 190 to 220° C. and had an intrinsic viscosity of 1.50. It was injection molded into test pieces 3 mm. thick, which were used for the tests described below. It could also be formed into bottles, pipe, tubing and molded goods of all kinds, as well as into film suitable for food packaging and other uses.

EXAMPLE IV 2.03 g. of terephthaloyl chloride was dissolved in 100 ml. carbon tetrachloride and vigorously stirred in a mixer equipped with rotating blades. To this mixture, a solution of 1.5 g. of 2-methyl-4-ethylhexamethylenediamine and 1.3 g. potassium hydroxide in 200 ccm. water was added all at once. The polyamide formed immediately in practically quantitative yield as a white powder. It was stirred for a further 3 minutes, then sucked off, washed several times with methanol and water and dried. The resulting polyamide (2.5 g.) had a melting point of 180 to 190° C. and an intrinsic viscosity of 0.35, indicating a much lower molecular weight than the polyamides of the previous examples.

EXAMPLE V

The process of Example II was followed, using 16.6 parts of terephthalic acid and 16.5 parts of 2-ethyl-4-methylhexamethylenediamine in the preparation of the salt.

The polyamide which was produced by the polycondensation reaction was transparent and glass clear, melted over the range of 180 to 190° C. and had an intrinsic viscosity of 1.2. The polymer was cast into rods which could be readily cut or machined to the desired shape.

EXAMPLE VI

The process of Example V was followed, using 16.5 parts of an isomeric mixture of 2-methyl-4-ethyl- and 2-ethyl-4-methylhexamethylenediamine in the preparation of the salt. The polyamide which was formed by polycondensation of the salt was very similar to that formed in Example V, except that it melted over the range of 180 to 200° C.

EXAMPLE VII

A polyamide was made by the process of Example I, using 16.6 parts of terephthalic acid and 23.9 parts of 3-isooctylhexamethylenediamine in the preparation of the salt. The polyamide which was formed by polycondensation of the salt was transparent and glass clear, melted over a range of 160 to 190° C. and had an intrinsic viscosity of 1.2. Clear, highly flexible films suitable for use in packaging applications could be formed from this polyamide.

EXAMPLE VIII

A polyamide was made by the process of Example III using 16.6 parts of isophthalic acid and 16.5 parts of an isomeric mixture of 2,2,4- and 2,4,4-trimethylhexamethylenediamine in the preparation of the salt.

The polyamide which was produced by the polycondensation reaction was transparent, glass clear, melted over a range of 130 to 145° C. and had an intrinsic viscosity of 0.9. Except for its lower softening temperature and a somewhat lower tensile strength, its properties were similar to those of the terephthalamide of Example III. It could be used for the production of a large number of useful molded articles, as well as sheets and films and was particularly suitable for the production of liquid coating or adhesive compositions.

EXAMPLE IX

A polyamide was made by the process of Example II, using 16.6 parts of isophthalic acid and 16.5 parts of an isomeric mixture of 2-methyl-4-ethyl- and 2-ethyl-4-methyl-hexamethylenediamine in the preparation of the salt.

The polyamide which was produced by the polycondensation was transparent, glass clear, melted over a range of 120 to 135° C., and had an intrinsic viscosity of 1.4. The polyamide was obtained in the form of cylindrical rods, which could be machined or cut into the desired shape. If desried, the rods could be cut into chips, melted, and molded by any of the usual molding techniques.

EXAMPLE X

A polyamide was made by the process of Example II, using 16.6 parts of isophthalic acid and 16.5 parts of 3-isopropylhexamethylenediamine in the preparation of the salt.

The polyamide which was produced by the polycondensation was transparent and glass clear, melted over a range of 150 to 160° C. and in its other properties was generally similar to the polyamide of Example I.

EXAMPLE XI

A polyamide was made by the process of Example II, using 16.6 parts of a mixed acid containing 95 percent of terephthalic acid and 5 percent of isophthalic acid, together with 16.5 parts of an isomeric mixture of 2,2,4- and 2,4,4-trimethylhexamethylenediamine in the preparation of the salt.

The polyamide which was produced by the polycondensation step was transparent and glass clear, melted over a range of 175 to 200° C. and had an intrinsic viscosity of 1.3.

EXAMPLE XII

The process of Example XI was carried out with an acid mixture containing 90 percent terephthalic acid and 10 percent isophthalic acid and the same diamine. The resulting polymer was clear and transparent, melted over a range of 165 to 190° C. and had an intrinsic viscosity of 1.2.

The polyamides prepared according to Examples XI and XII were compared with a series of supercondensation polymers made with the same diamine, and with acid mixtures varying from 100 percent terephthalic acid to 100 percent isophthalic acid. The polyamide from 100 percent terephthalic acid melted over a range of 185 to 210° C., and that from 100 percent isophthalic acid had a melting range of 135 to 150° C. The melting points of the polyamides made from acids of intermediate compositions did not go through a eutectic point, as would normally be expected, but dropped rather sharply with the addition of the first 20 percent of isomeric acid to a melting range of 155 to 170° C., and then fell more gradually over the rest of the range of admixtures, to the melting point of the 100 percent isophthalic acid polymer. The polymer made from a mixture of 40 percent terephthalic acid and 60 percent isophthalic acid, for example, melted between 140 and 155° C., while the polymer made from a mixture of 60 percent terephthalic acid and 40 percent isophthalic acid melted between 145 and 160° C. All the intermediate polymers were clear and transparent, like those of the pure acids. The mechanical properties of the mixed acid polymers varied between those of the polymers made with the pure acids. The mechanical properties of the polymers made with acid mixtures containing not more than 10 percent of isophthalic acid were particularly noteworthy, being indistinguishable from the properties of the pure terephthalamide. The use of larger amounts of isophthalic acid, however, brought about a noticeable deterioration of the various mechanical properties such as tensile strength, impact resistance, flexural strength, etc., causing these properties to approach those of the somewhat less desirable isophthalamide polymer.

EXAMPLE XIII

The process of Example XI was carried out, using a mixed acid containing 95 percent terephthalic acid and 5 percent isophthalic acid, and 3-isopropylhexamethylenediamine in the preparation of the salt. The polyamide resulting from the condensation step was transparent, clear, melted over a range of 195 to 210° C. and had an intrinsic viscosity of 1.2.

EXAMPLE XIV

The process of Example XI was carried out, using 16.6 parts by weight of a mixed acid containing 95 percent of terephthalic acid and 5 percent isophthalic acid, and 23.9 parts by weight of 3-isooctylhexamethylenediamine in the preparation of the salt. The polyamide which was formed in the condensation step was transparent, glass clear, melted over a range of 145 to 175° C. and had an intrinsic viscosity of 1.2.

EXAMPLE XV

Polyamides were made according to the process of Example II using terephthalic acid and the following substituted hexamethylenediamines: 3-methylhexamethylenediamine; 2-methylhexamethylenediamine; and 2,5-dimethylhexamethylenediamine. The resultant products were compared with several of the new terephthalamides made according to the preceding examples, the results of the comparison being shown in Table I.

*Table I*

| Ex. No. | Hexamethylene diamine used | Melting point, °C. | Optical properties | Crystallinity | Useful textile fibers |
|---|---|---|---|---|---|
| I | 3-isopropyl- | 210-220 | Transparent. | Amorphous. | No. |
| II | 2,2,4-trimethyl- | 200-220 | ---do------ | -----do------- | No. |
| III | Isomeric mixture 2,2,4- and 2,4,4-trimethyl-. | 190-220 | ---do------ | -----do------- | No. |
| IV | 2-methyl-4-ethyl. | 180-190 | ---do------ | -----do------- | No. |
| V | 2-ethyl-4-methyl-. | 180-190 | ---do------ | -----do------- | No. |
| VI | Isomeric mixture 2-methyl-4-ethyl- and 2-ethyl-4-methyl. | 180-200 | ---do------ | -----do------- | No. |
| VII | 3-isooctyl- | 160-190 | ---do------ | -----do------- | No. |
| XV | 3-methyl- | 270-280 | Opaque. | Crystalline. | Yes. |
| XV | 2-methyl- | 300 | ---do------ | -----do------- | Yes. |
| XV | 2,5-dimethyl- | 285 | ---do------ | -----do------- | Yes. |

It will be seen by reference to Table I that the new polyamides of my invention possess properties which are strikingly and unexpectedly different from the very closely related polymers made according to Example XV. The sudden change from opaque, crystalline, textile fiber-forming polymers to glass clear, completely amorphous resins which do not form useful textile fibers, with such a seemingly minor change in structure could not have been predicted.

The polyterephthalamide of Example III made from the isomeric mixture of trimethylhexamethylenediamines, which is typical of the new polyamides of my invention, was compared with nylon 6, with the terephthalic acid 3-methylhexamethylenediamine polyamide of Example XV and with polymethylmethacrylate, a typical vinyl polymer, in a series of standard tests. The results of these tests are reproduced in Table II.

The softening range of a given polymer was determined by heating chips of the polymer under nitrogen until the chips could be deformed by slight pressure of a glass rod or spatula, and then continuing to heat until the polymer actually melted and flowed. The softening range is the temperature range between the softening or deformation point and the flow temperature, and is given in terms of a minimum range, e.g., >30 degrees centigrade, >40 degrees centigrade, etc.

Other tests were carried out under standard conditions of 20° C. and 65 percent relative humidity. In the tensile, elongation and yield stress tests, the clamping jaws were moved with such speed that break of the sample occurred after 60 seconds.

*Table II*

| Property | Column I Nylon 6 | Column II T/3M6 polyamide a | Column III T/2,4M₃6 polyamide b | Column IV Polymethyl methacrylate |
|---|---|---|---|---|
| Softening range, deg | 2-5 | 3-8 | >40 | >40. |
| Yield stress (kg./cm.²) | 320 | 430 | 780 | 700-760. |
| Elongation at break, percent | 250-320 | 210-270 | 1-3 | 2-5. |
| Impact strength (cm. kg./cm.²) | >68 | >68 | >68 | 18-20. |
| Vicat temperature, °C | 170 | 200-210 | 156 | 90-110. |
| Crystallinity | Crystalline. | Crystalline. | Amorphous. | Amorphous. |
| Optical properties | Opaque. | Opaque. | Clear. | Clear. | a Terephthalic acid/3-methylhexamethylenediamine polyamide.
b Terephthalic acid/2,2,4- and 2,4,4-trimethylhexamethylenediamine polyamide (isomeric mixture).

It is evident from Table II that the polyamides in columns one and two do not differ substantially from one another, whereas the new polyamide of column three shows certain striking differences. The softening range of the new polyamide is greater than 40° C., which is very similar to that of polymethylmethacrylate, and not at all like the narrow softening ranges of the typical polyamides of columns one and two. In addition, not only does this new polyamide exhibit an exceptionally high yield stress value of 780 kg./cm.², but it is capable of undergoing almost no elongation before it reaches the breaking point. The new polyamides of my invention, in fact, all show very low elongation values, typically below 10 percent elongation at break. The yield stress value for the new polyamide is thus almost exactly equal to its tensile strength and the new polyamide is elastic under loads which are nearly equal to the stress at break. The impact strength of my new polyamide, on the other hand, is in the range exhibited by the conventional nylons shown in the first two columns of Table II. Its Vicat, or softening, temperature is also quite high, being much closer to that of nylon 6 than to that of polymethylmethacrylate. Because of this high softening temperature, films and containers of the new polyamide may safely be exposed to boiling water and steam. This is a most advantageous property, since it will make possible the sterilization of foodstuffs in packages made of the new polyamides. It will be seen from Table II that the new polyamides of my invention combine many of the desirable properties of both nylon polymers and vinyl polymers such as polymethylmethacrylate. Many fields of application are thus open to the new polyamides of my invention in which the conventional polyamides have not been satisfactory.

The new polyamides of my invention are surprisingly flexible and non-brittle in view of their low elongation capacities. The flexural strength of the polyamide of Example III was tested by bending a sample of the resin over a mandrel at an angle of 60° and measuring the amount of bending force which could be applied to the sample before breakage occurred. A flexural strength value of 1620 kg./cm.² was found for the new polyamide compared with a value of 270 kg./cm.² for nylon 6 and 1000–1200 kg./cm.² for polymethylmethacrylate.

Further tests were carried out with the trimethylhexamethylenediamine-terephthalic acid polymer to determine its behavior toward various solvents. Samples of the polymer measuring 20 x 10 x 3 mm. were prepared and, after weighing, were completely immersed in the different liquids at room temperature. Every one to two weeks, the samples were rinsed with water or acetone, air-dried for two hours and then weighed.

No weight change was observed in the following liquids: n-hexane, n-heptane, benzene, tetrahydronaphthalene, cyclohexanone, carbon tetrachloride, ethyl acetate and vinyl acetate.

The behavior of the trimethyl-substituted polyamide in water was of particular interest. After 114 days, less than 3 percent of water was absorbed, compared with a water absorption for conventional nylons of about 10 percent in two weeks. The relatively high water resistance of the polyamides of my invention should make them particularly useful in electrical insulation and in applications where they are subjected to constant contact with moisture.

The trimethyl substituted polyamide also had the surprising property of extensive swelling in alcohols, for example, methanol, ethanol, and isopropanol. The polymer does not go into complete solution in these solvents but swells so completely in the course of a few hours that it is liquefied to a viscous, pourable paste. The pourable pastes containing the new polyamides may be used in various coating applications, for textile finishing and for adhesives.

The new polyamides of my invention have been found to be soluble in a mixture of 80 volumes of chloroform and 20 volumes of methanol. Solutions of up to 30 percent concentration may be prepared, and may be used to cast clear, tough polymer films.

The polyamides were also found to absorb large quantities of methylene chloride and chloroform. While these solvents do not liquefy the polyamides, they serve as softening or plasticizing agents, and facilitate working the polyamides in Banbury mixers, roller mills, etc., at which time plasticizers, foaming agents, dyestuffs, stabilizers and the like may be incorporated.

The novel polyamides of my invention are particularly useful as molding resins for the formation of shaped articles of all descriptions. They may be used, for example, in the production of temperature- and impact-resistant transparent plastic drinking glasses, oil- and fat-resistant containers, bottles, pouches and other food packages. The wide thermoplastic range of these polyamides not only facilitates the vacuum formation of sheet material and the formation of films by blowing and calendering, but also makes possible the production of pipes and tubing which are glass clear even at high wall thickness.

This application is a continuation-in-part of my copending application, Serial No. 64,713, filed October 25, 1960, now abandoned.

I claim:

1. A liner amorphous film-forming polyamide of an aromatic dicarboxylic acid selected from the group consisting of terephthalic acid, isophthalic acid and an acid mixture of 90 to 95 percent terephthalic acid and 5 to 10 percent isophthalic acid consisting of recurring structural units of the formula

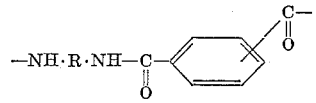

wherein R is an alkyl-substituted saturated hydrocarbon chain 6 carbon atoms in length in which the alkyl substitution consists of three to eighteen carbon atoms.

2. The polymer of claim 1 wherein the acid is terephthalic acid.

3. The polymer of claim 1 wherein the acid is isophthalic acid.

4. The polymer of claim 1 wherein the acid is a mixture of 90 to 95 percent terephthalic acid and 5 to 10 percent isophthalic acid.

5. The polymer of claim 1 wherein the acid is terephthalic acid and R is the alkyl-substituted hydrocarbon chain of 3-isopropylhexamethylenediamine.

6. The polymer of claim 1 wherein the acid is terephthalic acid and R is the alkyl-substituted hydrocarbon chain of 2,2,4-trimethylhexamethylenediamine.

7. The polymer of claim 1 wherein the acid is terephthalic acid and R is the alkyl-substituted hydrocarbon chain of 2,4,4-trimethylhexamethylenediamine.

8. The polymer of claim 1 wherein the acid is terephthalic acid and R is the alkyl-substituted hydrocarbon chain of a mixture of 2,2,4- and 2,4,4-trimethylhexamethylenediamine.

9. The polymer of claim 1 wherein the acid is terephthalic acid and R is the alkyl-substituted hydrocarbon chain of 2-methyl-4-ethylhexamethylenediamine.

10. The polymer of claim 1 wherein the acid terephthalic acid and R is the alkyl-substituted hydrocarbon chain of 2-ethyl-4-methylhexamethylenediamine.

11. The polymer of claim 1 wherein the acid is terephthalic acid and R is the alkyl-substituted hydrocarbon chain of a mixture of 2-methyl-4-ethyl- and 2-ethyl-4-methyl-hexamethylenediamine.

12. The polymer of claim 1 wherein the acid is terephthalic acid and R is the alkyl-substituted hydrocarbon chain of 3-isooctylhexamethylenediamine.

13. The polymer of claim 1 wherein the acid is isophthalic acid and R is the alkyl-substituted hydrocarbon chain of a mixture of 2,2,4- and 2,4,4-trimethylhexamethylenediamine.

14. The polymer of claim 1 wherein the acid is isophthalic acid and R is the alkyl-substituted hydrocarbon chain of a mixture of 2-methyl-4-ethyl- and 2-ethyl-4-methyl-hexamethylenediamine.

15. The polymer of claim 1 wherein the acid is isophthalic acid and R is the alkyl-substituted hydrocarbon chain of 3-isopropylhexamethylenediamine.

16. The polymer of claim 1 wherein the acid is a mixture of 95 percent terephthalic acid and 5 percent isophthalic acid and R is the alkyl-substituted hydrocarbon chain of a mixture of 2,2,4- and 2,4,4 - trimethylhexamethylenediamine.

17. The polymer of claim 1 wherein the acid is a mixture of 90 percent terephthalic acid and 10 percent isophthalic acid and R is the alkyl-substituted hydrocarbon chain of a mixture of 2,2,4- and 2,4,4-trimethylhexamethylenediamine.

18. The polymer of claim 1 wherein the acid is a mixture of 95 percent terephthalic acid and 5 percent isophthalic acid and R is the alkyl-substituted hydrocarbon chain of 3-isopropylhexamethylenediamine.

19. The polymer of claim 1 wherein the acid is a mixture of 95 percent terephthalic acid and 5 percent isophthalic acid and R is the alkyl-substituted hydrocarbon chain of 3-isooctylhexamethylenediamine.

20. A process for producing a linear amorphous film-forming polyamide which comprises condensing substantially equimolar proportions of an acid selected from the group consisting of terephthalic acid, isophthalic acid and an acid mixture of 90 to 95 percent terephthalic acid and 5 to 10 percent isophthalic acid with an alkyl-substituted aliphatic hexamethylenediamine in which the alkyl substitution consists of three to eighteen carbon atoms.

References Cited in the file of this patent
UNITED STATES PATENTS

| | | |
|---|---|---|
| 2,742,496 | Lum et al. | Apr. 17, 1956 |
| 2,766,221 | Lum et al. | Oct. 9, 1956 |
| 2,864,807 | Nobis et al. | Dec. 16, 1958 |
| 2,902,475 | Burkhard | Sept. 1, 1959 |